(12) United States Patent
Yagi et al.

(10) Patent No.: US 7,088,516 B2
(45) Date of Patent: Aug. 8, 2006

(54) WIDE FIELD OF VIEW HEAD MOUNTED DISPLAY DEVICE

(75) Inventors: Yasushi Yagi, Ashiya (JP); Masahiko Yachida, Amagasaki (JP); Hajime Nagahara, Minoo (JP)

(73) Assignee: Osaka University, Suita (JP)

( * ) Notice: Subject to any disclaimer, the term of this patent is extended or adjusted under 35 U.S.C. 154(b) by 246 days.

(21) Appl. No.: 10/454,535

(22) Filed: Jun. 5, 2003

(65) Prior Publication Data

US 2004/0070839 A1    Apr. 15, 2004

(30) Foreign Application Priority Data

Sep. 2, 2002    (JP) ............................. 2002-256377

(51) Int. Cl.
  *G02B 27/14* (2006.01)
  *G02B 23/00* (2006.01)
(52) U.S. Cl. .................. 359/630; 359/633; 359/366
(58) Field of Classification Search ........ 359/630–637, 359/365, 366; 345/7, 8, 9
  See application file for complete search history.

(56) References Cited

U.S. PATENT DOCUMENTS

| 5,768,039 A | * | 6/1998 | Togino ........................ 359/850 |
| 5,959,780 A | * | 9/1999 | Togino et al. ............... 359/630 |
| 5,986,812 A | * | 11/1999 | Takahashi .................... 359/630 |
| 6,097,542 A | * | 8/2000 | Takahashi et al. ........... 359/631 |

FOREIGN PATENT DOCUMENTS

| JP | A-07-120679 | 5/1995 |
| JP | A-08-286140 | 11/1996 |
| JP | A-08-286144 | 11/1996 |
| JP | A-09-189880 | 7/1997 |
| JP | A-2001-290102 | 10/2001 |

OTHER PUBLICATIONS

Translated Office Action issued in Japanese Patent Application No. 2002-256377.

* cited by examiner

*Primary Examiner*—Scott J. Sugarman
*Assistant Examiner*—Mohammed Hasan
(74) *Attorney, Agent, or Firm*—Oliff & Berridge, PLC (57) ABSTRACT

Provided is a wide field of view head mounted display device capable of presenting 120 degree field of view per one eye and 180 or more by both eyes horizontally while keeping resolution at least to the same extent of the conventional art. The wide field of view head mounted display device includes: a LCD 1 for displaying an image; a lens 2 for projecting an image displayed on the LCD 1; and a catoptric system with a concave mirror 4 and a convex mirror 3. The LCD 1 and the lens 2, the concave mirror 4 and convex mirror 3 are positioned in a relative relationship to observe by an observing pupil 5 at a predetermined position a virtual image of a beam of reflected light as an incident light on the concave mirror 4 when the light of displayed image on the LCD 1 is projected to the convex mirror 3 through the lens 2 and a reflected light of the projected light at the convex mirror 3 arrives as the incident light at the concave mirror 4.

20 Claims, 10 Drawing Sheets

WIDE FIELD OF VIEW HEAD MOUNTED DISPLAY DEVICE

BACKGROUND OF THE INVENTION

1. Field of the Invention

The present invention relates to an image display device, more particularly to a head mounted display device.

2. Description of Related Art

In conventional arts, various types of head mounting devices (HMD) have been proposed, as shown in "Journal of Nippon Virtual Reality Society"; "Special issue on HMD", December 1998, Vol. 3, No. 2, pages 5 to 41, for example. They are largely classified in two types: one is an eyepiece optical type comprising a display element and eyepiece lenses that magnifies it directly; another is an eyepiece relay type by which a displayed image is focused once by a relay optical system and then the imaging surface is magnified by an eyepiece lens system. Eyephone 02 sold by VPL Company magnifies and displays an LCD (liquid crystal display element) in 86,000 pixels and thereby realizes 80 degree of the field angle for the purpose of wider field angle. However, the LCD in 86,000 pixels is not sufficient in view of resolution.

Further, other devices are proposed such as a device with 50 degree of the field angle by eccentric optical system in which a concave mirror is used and a device developed by Canon Corporation that realizes 43.5 degree of the field angle by an eyepiece relay system in which a free curved prism is used for a mirror. Olympus Optics Company also realizes 80 degree of the field angle for which a sheet of eccentric concave mirror is used. Further, Datavisor 80 by N-Vision Company as a HMD with wide field of view and high resolution realizes 80 degree in one eye and 120 degree in both eyes of the field of view. Also other example realizes 100 degree of the field of view by using two LCDs for one eye.

An example in Nara, Ifukube, Ino, Takahashi, and Yamamoto: "Affect on posture control by sight movement stimulus by wide field of view HMD" in papers of Nippon Virtual Reality Society, 1996, Vol. 1, pages 33 to 39 realizes 140 degree of the field of view by an eyepiece optical system by using two LCDs for one eye. However, it is said that field of view of human is 150 degree by one eye and 180 degree or more by both eyes horizontally. Therefore, the conventional studies mentioned above have not offered sufficient field of view.

An example in Inami, Kawakami, Yanagida, Maeda, and Tachi: "Wide field view stereoscopic display by Maxwell optical system" in papers of Nippon Virtual Reality Society, 1999, Vol. 4, No. 1, pages 287 to 294 realizes 110 degree of the maximum field of view in one eye by Maxwell optical system in which a half mirror and concave mirror are used, thereby wider field is given in comparison with the conventional art mentioned above. In this optical system, however, has a problem that, since a diameter of pupil affects the field of view, the brighter becomes a light source, the narrower becomes the field of view because of contraction of the diameter of the pupil.

SUMMARY OF THE INVENTION

As described above, it is pointed out as one of the problems that the field of view according to the head mounted display devices currently used is narrow. Therefore, an object of the present invention is to realize a head mounted display device with 120 degree of the field of view in one eye and 180 degree or more in both eyes horizontally while keeping at least the resolution same with the conventional art.

The wide field of view head mounting device according to the present invention includes: a display element displaying an image; a dioptric system for projecting a displayed image on said display element, and a catoptric system with a concave mirror and convex mirror, wherein said display element, said dioptric system and said catoptric system are arranged in a relative relationship in such a manner that a light of the displayed image on said display element is projected to said convex mirror through said dioptric system, a reflected light of the projected light on said convex mirror arrives at said concave mirror as an incident light, and a virtual image of a beam of reflected light of the incident light on said concave mirror is observed at a predetermined position for an observing pupil.

The wide field of view head mounted display device according to the present invention can realize a wide field of view in a compact device since the light of the displayed image on the display element is projected on the convex mirror through the dioptric system, and then the reflected light of the projected light on the convex mirror arrives as an incident light at the concave mirror allowing the wide field of view, and a virtual image of the beam of reflected light of the incident light on the concave mirror is observed at the predetermined position for the observing pupil In this connection, said concave mirror and convex mirror can be lightened if the mirror is made of an acrylic resin polished to mirror finish, for example.

In the wide field of view head mounting device according to the present invention, said convex mirror may be a mirror of hyperboloid of two sheets and either focus point of the mirror of hyperboloid of two sheets may be at a position of a lenticular principal point of said dioptric system. Further, said convex mirror may be a parabolic mirror and a projected light from said dioptric system may consists of parallel rays of light, or said convex mirror may be a spherical mirror. Furthermore, according to the wide field of view head mounted display device of the present invention, said concave mirror may be a spherical mirror and said convex mirror may be a half mirror, or said concave mirror may be an ellipsoidal mirror.

Further, the wide field of view head mounted display device of the present invention may be equipped with a physical relationship changing means to change at least two relative optical positions of said display element, said dioptric system and said catoptric system, whereby at least two relative optical positions of said display element, said dioptric system and said catoptric system can be adjusted to present a fine image.

According to the wide field of view head mounted display device of the present invention, a half mirror may be placed between said display element and said dioptric system and also an imaging element may be placed to pick up an image of said observing pupil corresponding to the half mirror. With such a constitution, an image can be presented without any effect of eclipse by an iris around a pupil due to change of the position of observing pupil, by changing at least two relative optical positions of the display element, dioptric system, and catoptric system by said physical relationship changing means.

DESCRIPTION OF THE PREFERRED EMBODIMENT

Now referring to attached drawings, the examples as embodiments according to the present invention are explained in detail. FIGS. 1 to 10 show a construction of the respective example for one eye according to the wide field of view head mounted display device of the present invention.

EXAMPLE 1

Figure 1A:
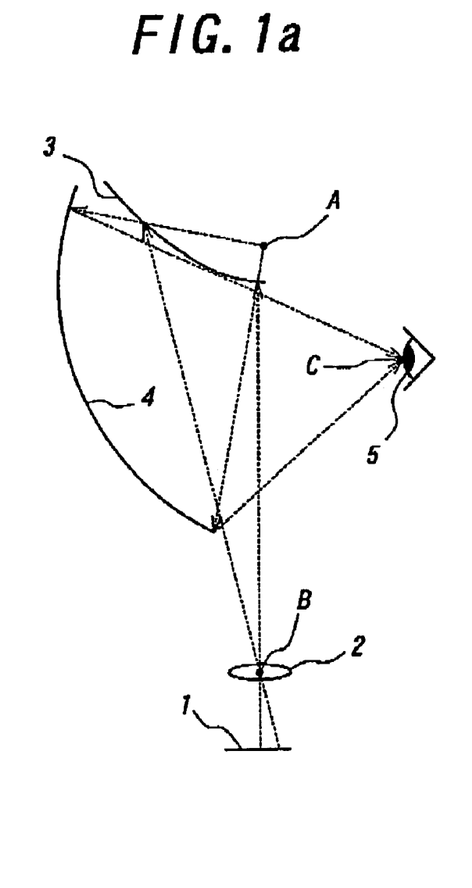
FIGS. 1a and 1b an explanatory views respectively showing a device of example 1 according to the present invention viewed from a side and upper direction.
Figure 1B:
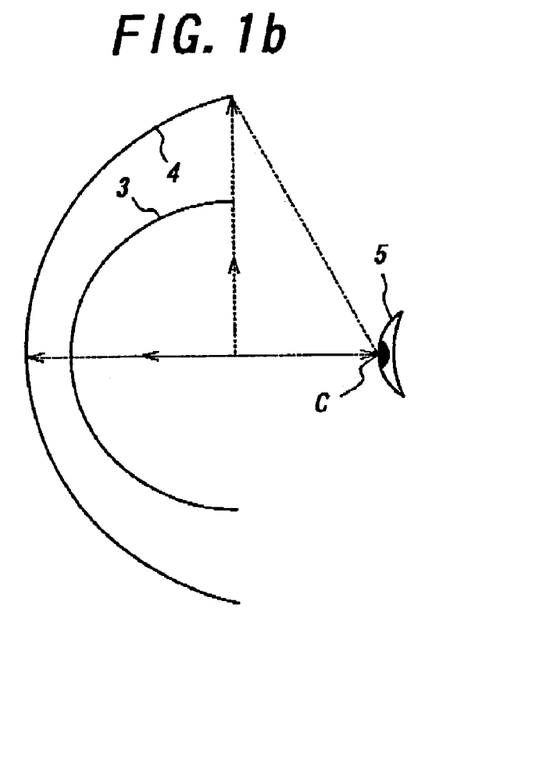

FIGS 1a and 1b are explanatory views to show the device of example 1 according to the present invention in combination of a convex hyperboloidal mirror and a concave ellipsoidal mirror viewed respectively from a side and upper direction (or position). A beam of light from a LCD (liquid crystal display element) 1 as a display element is projected as an incident light on a convex hyperboloidal mirror 3 by a lens 2 of a dioptric system. The principal point of the lens 2 is located at a focus B of the hyperboloidal mirror 3. When one of the focuses of the concave ellipsoidal mirror 4 is coincided with a focus A of the hyperboloidal mirror 3, a light component reflected on a line connecting an intersecting point of the incident light with the hyperboloidal mirror 3 and the focus A of the hyperboloidal mirror 3 goes toward another focus C of the ellipsoidal mirror 4 upon reflection thereupon. That is, a virtual image is formed on the same axis with the reflected light at an opposite side to the reflected light from the ellipsoidal mirror 4. Therefore, by allocating the focus C at a predetermined position of an observing pupil 5, an image can be presented in a manner to observe a virtual image.

EXAMPLE 2

Figure 2A:
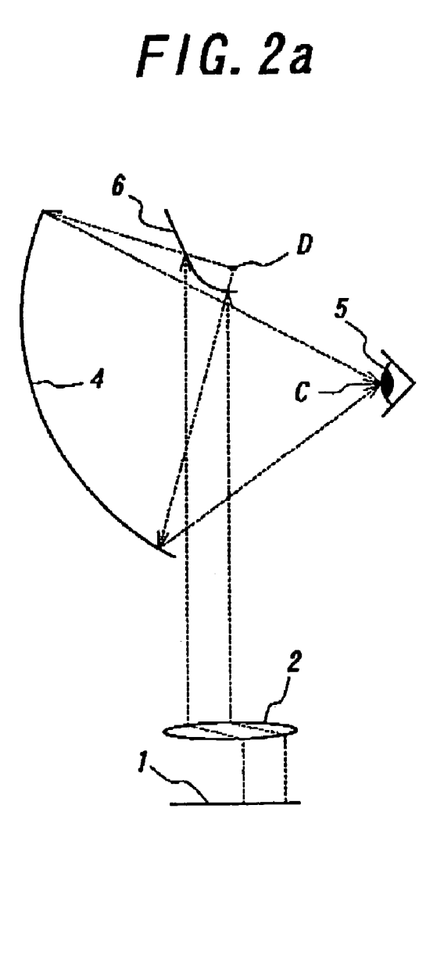
FIGS. 2a and 2b arm explanatory views respectively showing a device of example 2 according to the present invention viewed from a side and upper direction.
Figure 2B:
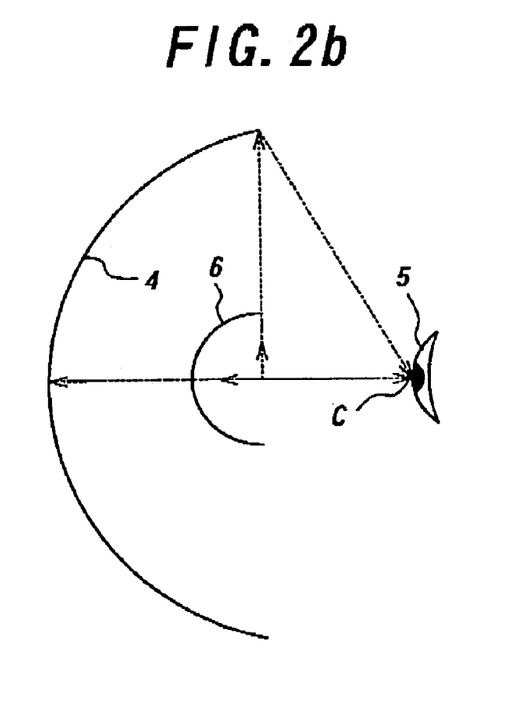

FIGS. 2a and 2b are explanatory views to show the device of example 2 according to the present invention in combination of a convex parabolic mirror and a concave ellipsoidal mirror viewed respectively from a side and upper direction. A beam of light from the LCD 1 as a display element is projected as an incident light on a convex parabolic mirror 6 by the lens 2 of a dioptric system. The lens 2 in this case constitutes a dioptric system such as a telecentric lens, for example, by which rays of incident light are projected as parallel rays. When one of the focuses of the concave ellipsoidal mirror 4 is coincided with a focus D of the parabolic mirror 6, a light component reflected on a line connecting an intersecting point of the incident light with the parabolic mirror 6 and the focus D of the parabolic mirror 6 goes toward another focus C of the ellipsoidal mirror 4 upon reflection thereupon. That is, a virtual image is formed on the same axis with the reflected light at an opposite side to the reflected light from the ellipsoidal mirror 4. Therefore, by allocating the focus C at a predetermined position of an observing pupil 5, an image can be presented in a manner to observe a virtual image.

EXAMPLE 3

Figure 3A:
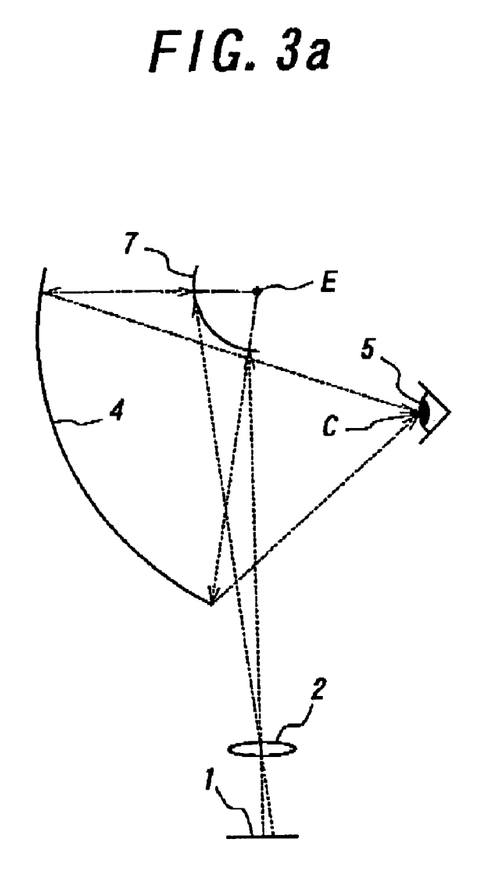
FIGS. 3a and 3b are explanatory views respectively showing a device of example 3 according to the present invention viewed from a side and upper direction.
Figure 3B:
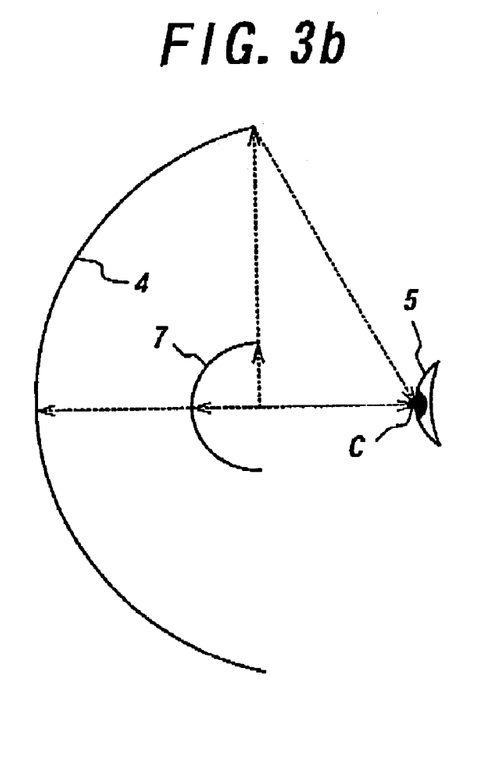

FIGS. 3a and 3b are explanatory views to show the device of example 3 according to the present invention in combination of a convex spherical mirror and a concave ellipsoidal mirror viewed respectively from a side and upper direction A beam of light from the LCD 1 as a display element is projected as an incident light on a convex spherical mirror 7 by the lens 2 of a dioptric system. When one of the focuses of the concave ellipsoidal mirror 4 is coincided with a center E of the spherical mirror 7, a light component reflected on a line connecting an intersecting point of the incident light with the spherical mirror 7 and the center E of the spherical mirror 7 goes toward another focus C of the ellipsoidal mirror 4 upon reflection thereupon. That is, a virtual image is formed on the same axis with the reflected light at an opposite side to the reflected light from the ellipsoidal mirror 4. Therefore, by allocating the focus C at a predetermined position of an observing pupil 5, an image can be presented in a manner to observe a virtual image

EXAMPLE 4

Figure 4A:
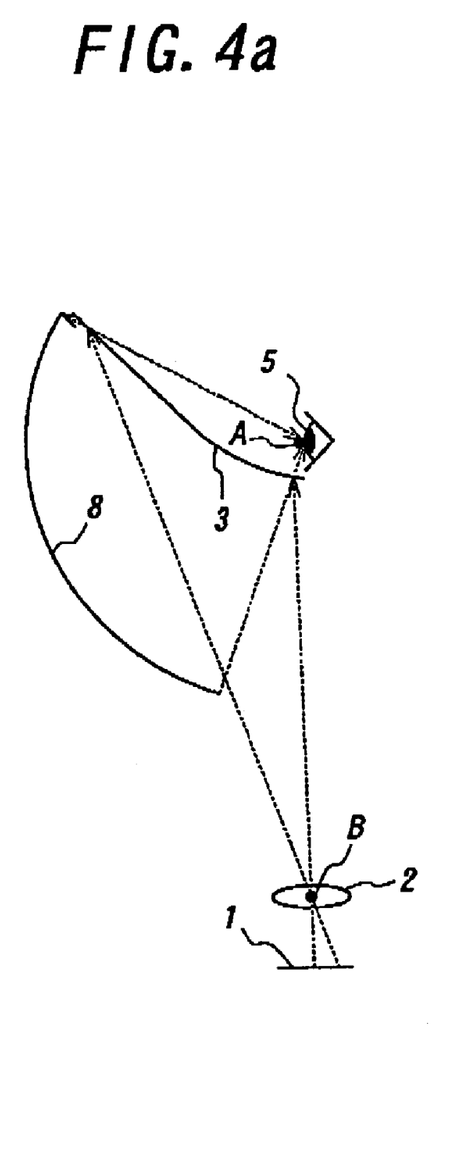
FIGS. 4a and 4b are explanatory views respectively showing a device of example 4 according to the present invention viewed from a side and upper direction.
Figure 4B:
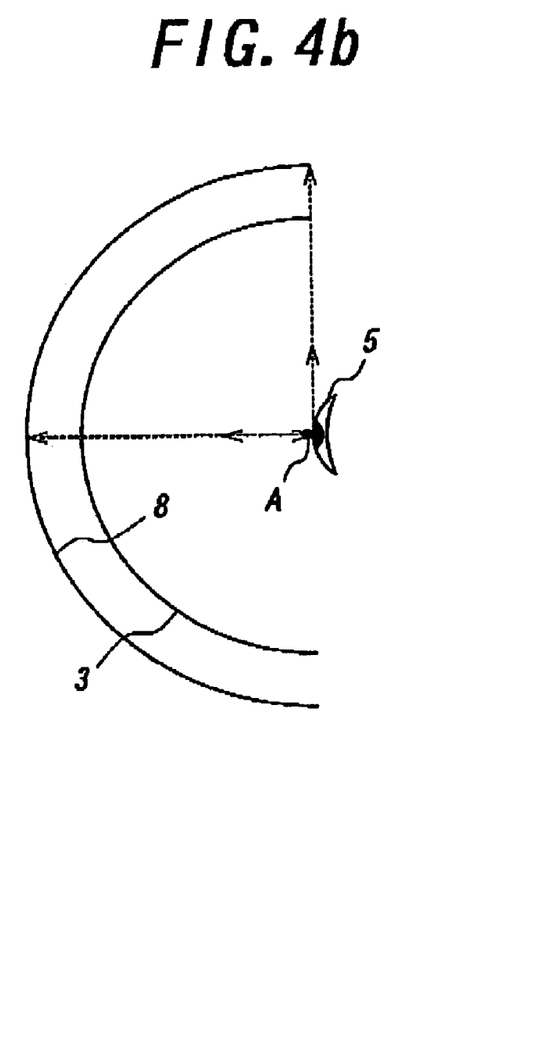

FIGS. 4a and 4b are explanatory views to show the device of example 4 according to the present invention in combination of a convex hyperboloidal mirror and a concave spherical mirror viewed respectively from a side and upper direction. A beam of light from the LCD 1 as a display element is projected as an incident light on the convex hyperboloidal mirror 3 by the lens 2 of a dioptric system. The principal point of the lens 2 is placed at a focus B of the hyperboloidal mirror 3. When the center of a concave spherical mirror 8 is coincided with a focus A of the hyperboloidal mirror 3, a light component reflected on a line connecting an intersecting point of the incident light with the hyperboloidal mirror 3 and the focus A of the hyperboloidal mirror 3 goes toward the center of the spherical mirror 8 upon reflection thereupon. That is, a virtual image is formed on the same axis with the reflected light at an opposite side to the reflected light from the spherical mirror 8. Therefore, by allocating the focus A at a predetermined position of an observing pupil 5 and making the hyperboloidal mirror 3 a half mirror, an image can be presented.

EXAMPLE 5

Figure 5A:
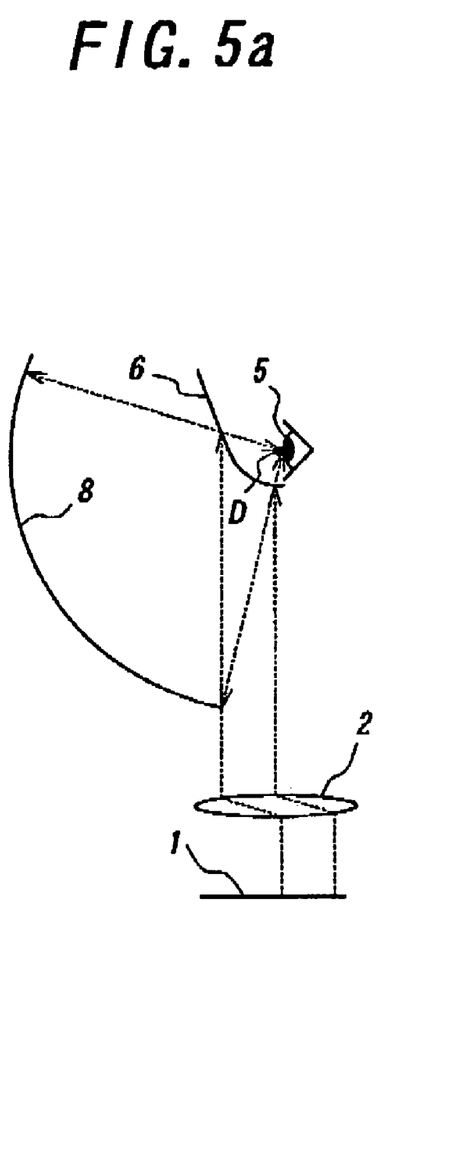
FIGS. 5a and 5b are explanatory views respectively showing a device of example 5 according to the present invention viewed from a side and upper direction.
Figure 5B:
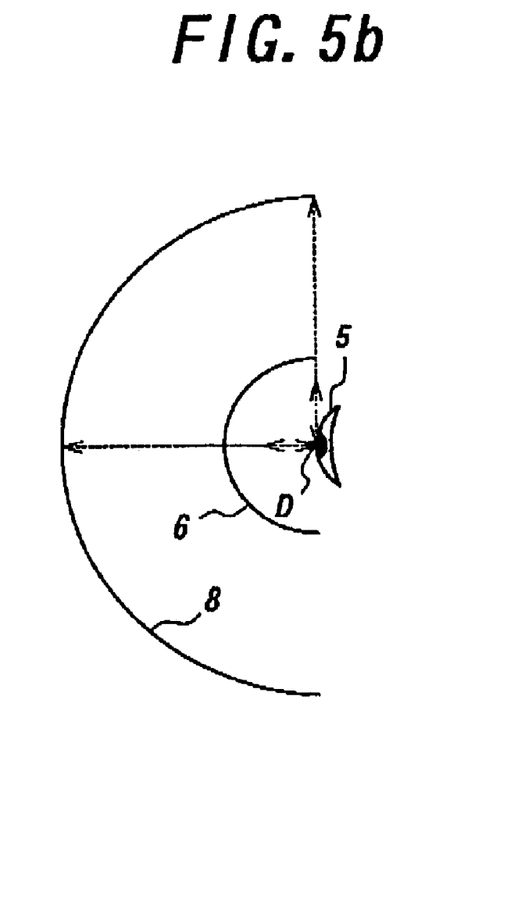

FIGS. 5a and 5b are explanatory views to show the device of example 5 according to the present invention in combination of a convex parabolic mirror and a concave spherical mirror viewed respectively from a side and upper direction. A beam of light from the LCD 1 as a display element is projected as an incident light on a convex parabolic mirror 6 by the lens 2 of a dioptric system. The lens 2 in this case constitutes a dioptric system such as a telecentric lens, for example, by which rays of incident light are projected as parallel rays. When the center of the concave spherical mirror 8 is coincided with a focus D of the parabolic mirror 6, a light component reflected on a line connecting an intersecting point of the incident light with the parabolic mirror 6 and the focus D of the parabolic mirror 6 goes toward the center of the spherical mirror 8 upon reflection thereupon. That is, a virtual image is formed on the same axis with the reflected light at an opposite side to the reflected light from the spherical mirror 8. Therefore, by allocating the focus C at a predetermined position of an observing pupil 5 and making the parabolic mirror 6 a half mirror, an image can be presented.

EXAMPLE 6

Figure 6A:
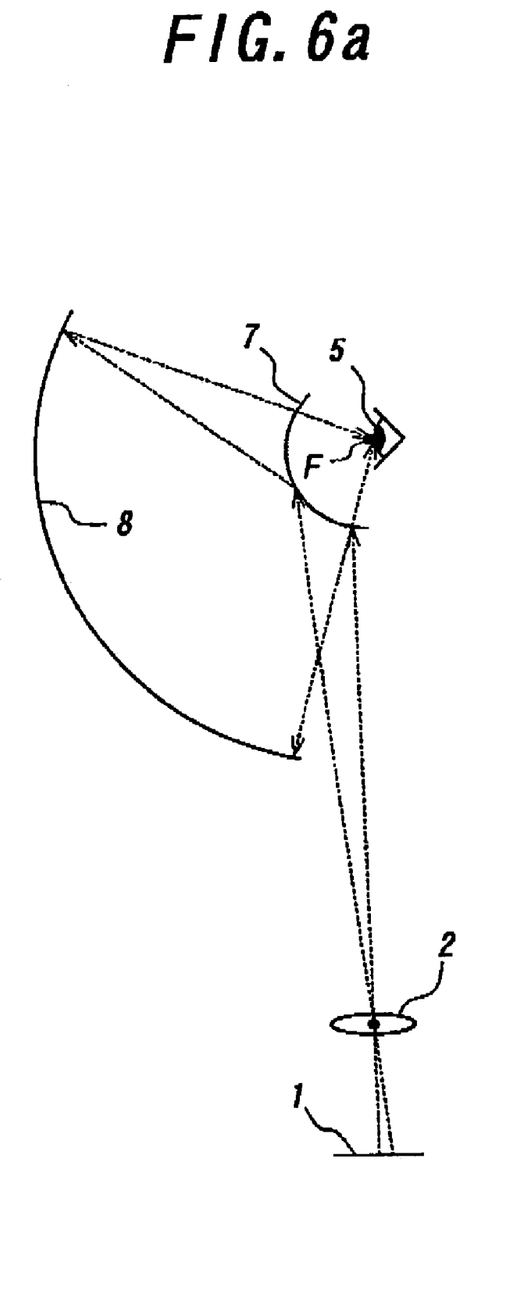
FIGS. 6a and 6b are explanatory views respectively showing a device of example 6 according to the present invention viewed from a side and upper direction.
Figure 6B:
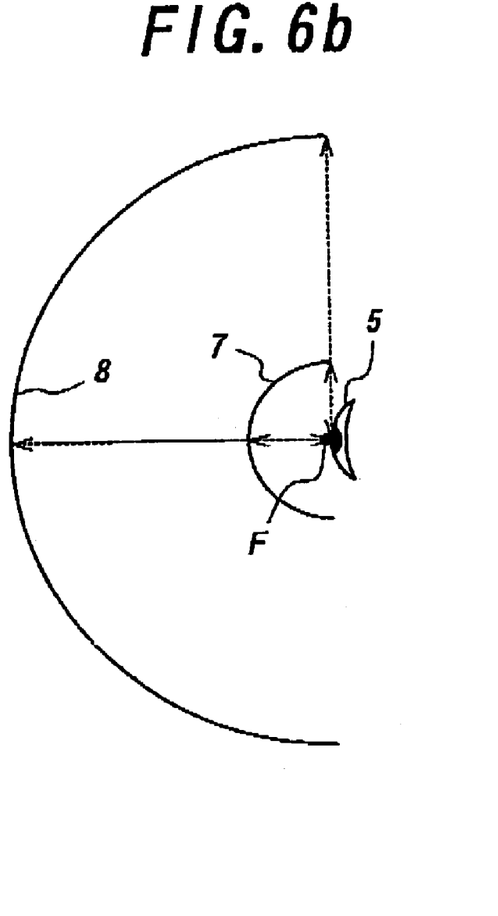

FIGS. 6a and 6b are explanatory views to show the device of example 6 according to the present invention in combination of a convex spherical mirror and concave spherical mirror viewed respectively from a side and upper direction. A beam of light from the LCD 1 as a display element is projected as an incident light on the convex spherical mirror 7 by the lens 2 of a dioptric system. When the center of the concave spherical mirror 8 is coincided with the center F of the convex spherical mirror 7, a light component reflected on a line connecting an intersecting point of the incident light with the convex spherical mirror 7 and the center F of the convex spherical mirror 7 goes toward the center F of the concave spherical mirror 8 upon reflection thereupon. That is, a virtual image is formed on the same axis with the reflected light at an opposite side to the reflected light from the concave spherical mirror 8. Therefore, by allocating the center C of the concave spherical mirror 8 at a predetermined position of an observing pupil 5 and making the convex spherical mirror 7 a half mirror, an image can be presented

EXAMPLE 7

Figures 7A, 7B:
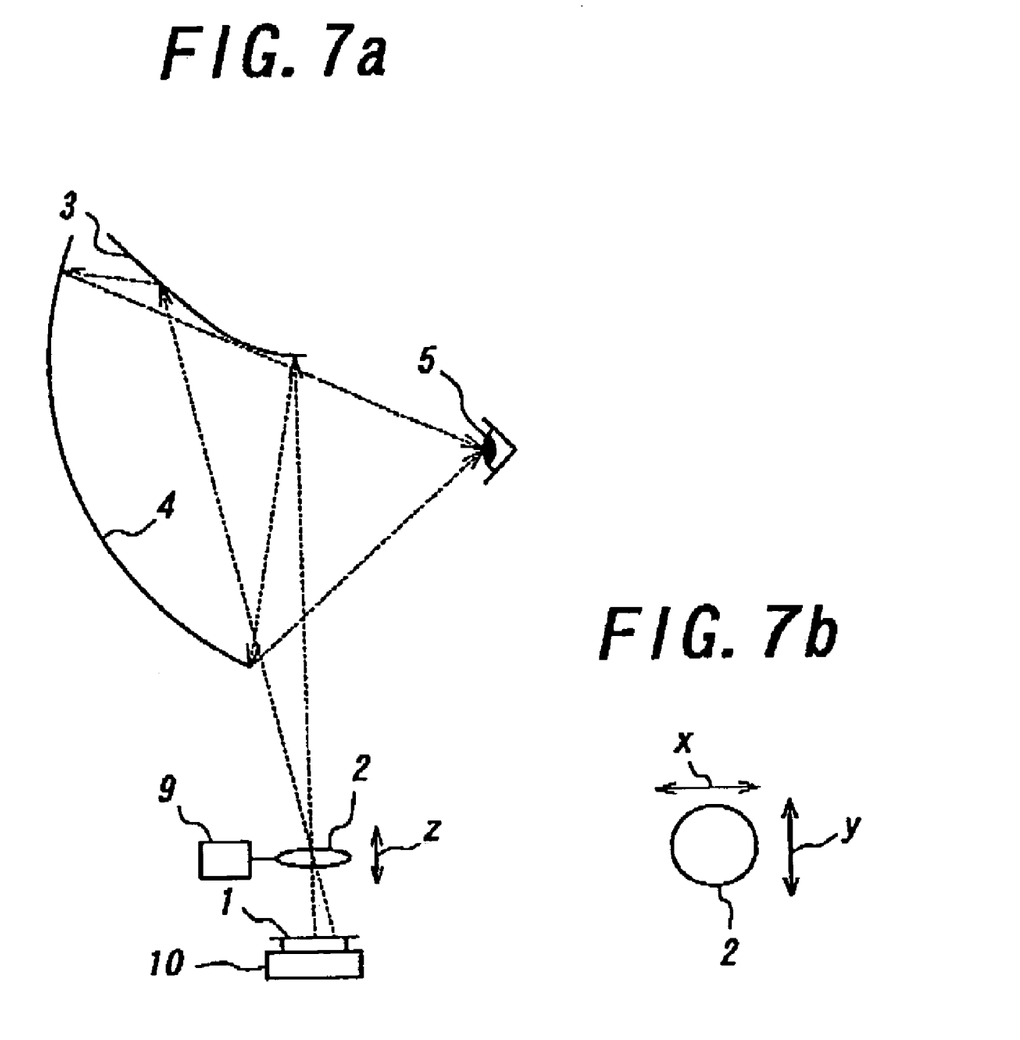
FIG. 7a is an explanatory view showing a device of example 7 according to the present invention viewed from a side.
FIG. 7b is an explanatory view showing the movement of the lens 2 of the device of example 7 according to the present invention viewed from an upper direction.

FIG. 7a is an explanatory view to show a device of example 7 according to the present invention viewed from a side, by which a relative positional relationship of a display element, a dioptric system and a catoptic system can be changed. FIG. 7b is an explanatory view of the movement of the lens 2 of the device of example 7 viewed from an upper direction. In addition to the constitution of the examples above (the constitution shown in FIG. 1 if shown), the device of this example is equipped with a lens moving mechanism 9 as a physical relationship changing means that is a piezo-actuator, for example, this mechanism 9 changing the position of the lens 2 of the dioptric system to the three dimensional direction along axes x, y, and z as shown, and a LCD moving mechanism 10 as a physical relationship changing mechanism that is a piezo-actuator, for example, this mechanism 10 changing the position of the LCD 1 as a display element to the three dimensional direction along axes x, y and z as in the similar case of the lens 2.

In the device of this example 7, when the LCD moving mechanism 10 changes the position of the LCD 1 to the direction along x and/or y axis only for a distance less than one pitch of the pixels (half pitch, for example), by displacement of the pixels, the same effect as when number of pixels is increased can be obtained without movement of a position of the observing pupil 5 due to movement of the optical system, thereby resolution can be enhanced. Also the change of position of the LCD 1 along z axis causes the focused point to change, and the focused point can be coincided with the observing position of an observer, thereby a fine image can be presented. Also the change of the position of the lens 2 to the direction along x, y and/or z axis by the lens moving mechanism 9 displaces the projected position, and the displacement of pixels brings enhanced resolution similarly. When the lens 2 is moved, whether the lens 2 is displaced to up and down or left and right, the constitution of the optical system including the catoptric system is changed and a light projected from the LCD 1 reflects on a concave mirror preventing itself from passing through a focus of the concave mirror, whereby the position of the observing pupil 5 is displaced a little bit from the position of the focus of the concave mirror and thereby eclipse by the iris can be dissolved. Appropriate control of moving quantity of the lens 2 at the same time of the dissolution of the eclipse makes high resolution possible in accordance with the above. Depending on difference of the lens position, it is preferable to distort the image projected from the LCD 1 in conformity with the optical system.

EXAMPLE 8

Figure 8:
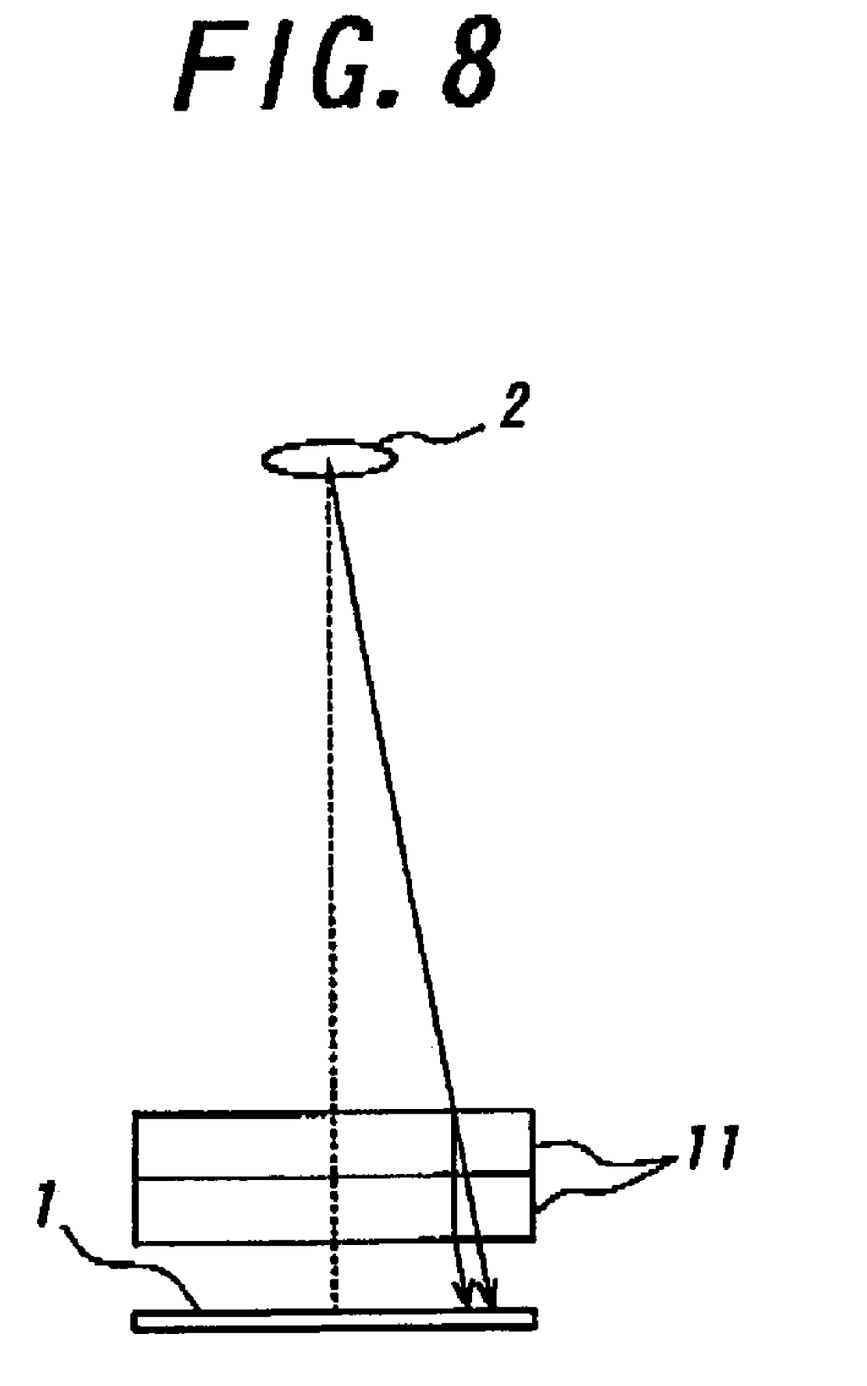
FIG. 8 is an explanatory view showing an essential part of a device of example 8 according to the present invention viewed from a side direction.

FIG. 8 is an explanatory view of essential parts of the device of example 8 according to the present invention, by which a positional relationship of a display element and a dioptric system can be changed optically. In the device of this example, a transparent plate 11 comprising a conductive optical transparent material is disposed between the LCD 1 and lens 2, as shown, in lieu of or in addition to the mechanical moving mechanisms 9, 10 in the constitution of the example 7 above. Since refraction rate or orientation of this transparent plate 11 changes when a power is applied, the relative positional relationship of the LCD 1 and the lens 2 can be changed optically depending on number or thickness of the transparent plate 11. Thereby resolution can be enhanced without changing the positional relationship between the lens 2 and the reflection mirror.

EXAMPLE 9

Figures 9A, 9B:
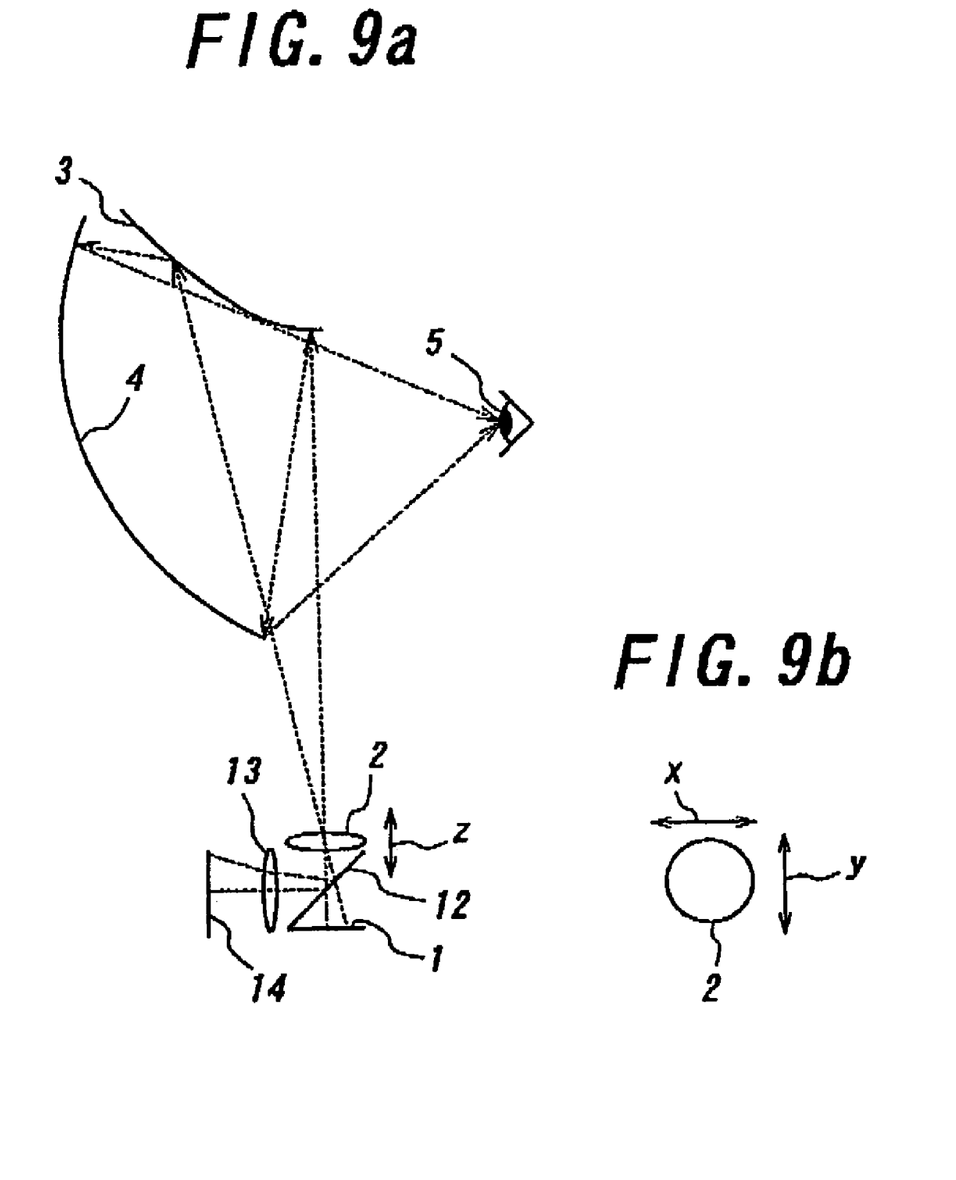
FIG. 9a is an explanatory view showing a device of example 9 according to the present invention viewed from a side.
FIG. 9b is an explanatory view showing the movement of the lens 2 of the device of example 9 according to the present invention viewed from upper direction.

FIG. 9a is an explanatory view of the device of the example 9 viewed from a side, enabling to pick-up an image of the pupil by a half mirror. FIG. 9b is an explanatory view showing from the upper direction the movement of the lens 2 of the device of the example 9. This device of this example is equipped with a half mirror 12 disposed between the LCD 1 and the lens 2, and lens 13 and an imaging element 14 positioned at the side of the half mirror 12 in addition to the constitution of the example above (the constitution shown in FIG. 7 if shown), the lens 13 magnifying an image of an observing pupil 5, and the imaging element 14 picking-up the image of it, thereby observation of the center of the pupil is made possible. With this constitution, by controlling the position of the lens 2 to the convex mirror 3 by the lens moving mechanism 9 in order for the position of the pupil to be a center of the imaging element 14, an image without eclipse can be presented.

EXAMPLE 10

Figure 10:
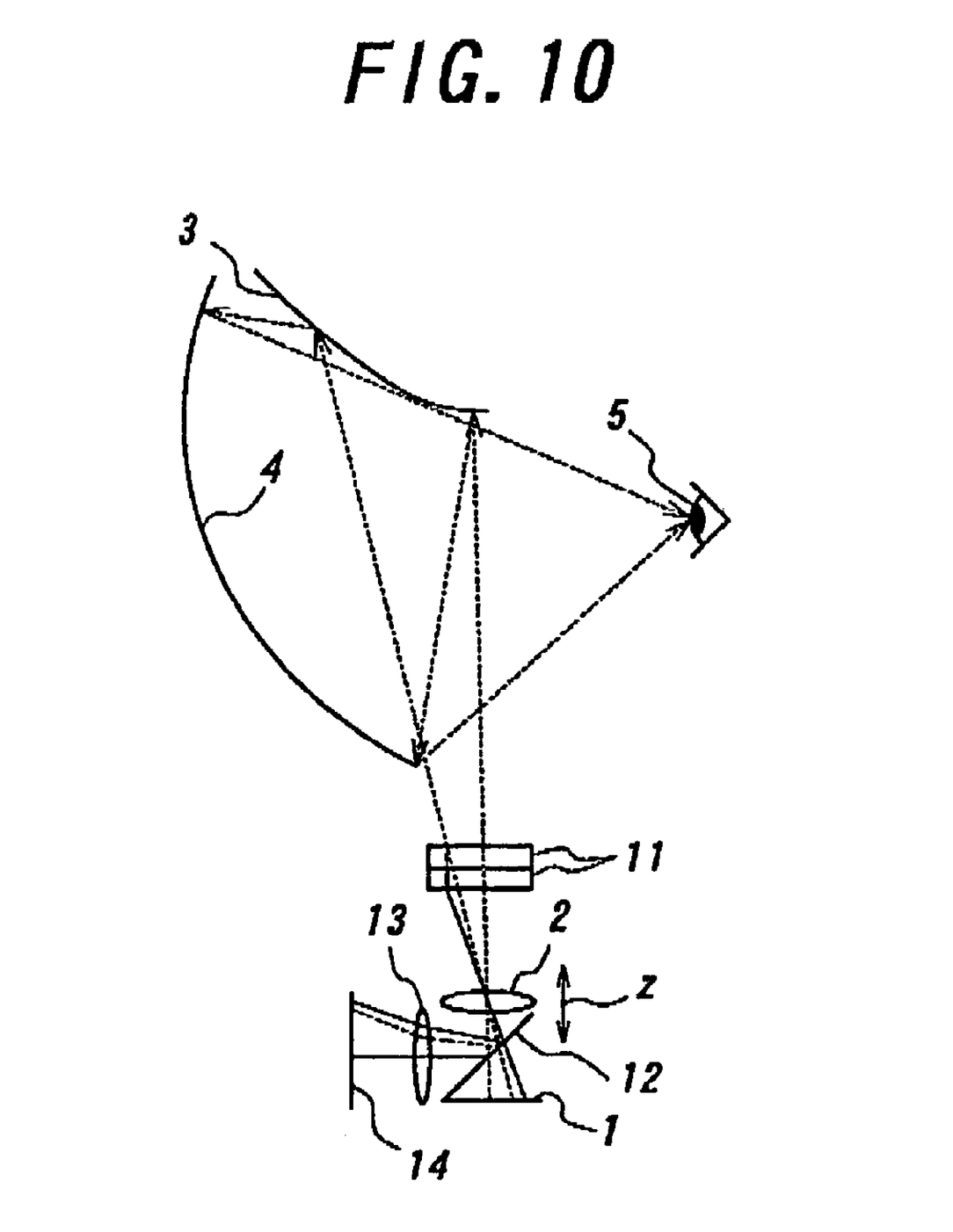
FIG. 10 is an explanatory view showing a device of example 10 according to the present invention viewed from a side direction.

FIG. 10 is also an explanatory view of the device of example 10 viewed from a side by which a pupil portion can be picked-up by a half mirror. The device of this example is equipped with the transparent plate 11 comprising a conductive optical transparent material disposed between the convex mirror 3 and the lens 2 in lieu of the lens moving mechanism 9 in the constitution of the example 9 shown in FIG. 9. Since refraction rate or orientation of this conductive transparent plate 11 changes when a power is applied, the relative positional relationship among the reflection mirror and the couple of lens 2 and LCD 1 can be changed optically depending on number or thickness of the transparent plate 11. With this constitution, by selecting the thickness of the conductive transparent plate 11 in order for the position of the pupil to be at a center of the imaging element 14, an image without eclipse can be presented.

Any of the concave reflection mirrors (ellipsoidal mirror 4 and spherical mirror 8) in any of the examples has a size to bring 120 degree field of view horizontally per one eye and 180 or more degree by both eyes, and 60 degree field of view vertically per one eye. And any of the convex reflection mirrors (hyperboloidal mirror 3, parabolic mirror 6 and spherical mirror 7) in any of the examples has a size capable of projecting the reflected lights to substantially all area of the concave reflection mirrors above.

The present invention has been described above based on the examples shown in the drawings. However, the present invention is not limited to the examples above and can be modified as needed within the scope of the claims.

What is claimed is:

1. A wide field of view head mounted display device comprising:
    a display element for displaying an image;
    a dioptric system for projecting a displayed image on said display element; and
    a catoptric system with a concave mirror adaptable to a wide field of view of horizontally 120 degree per one eye and a convex mirror with which a reflected light on said convex mirror can arrive as an incident light at whole of said concave mirror, wherein:
    said concave mirror is an ellipsoidal mirror defining a part of an elliptical shape when viewing from a side position thereof or a spherical mirror;
    said concave mirror is located at the front of a predetermined position for an observing pupil;
    said convex mirror is a hyperboloid mirror comprising two sheets defining a part of a hyperbola when viewing from a side position thereof, a parabolic mirror defining a part of a parabolic line when viewing from a side position thereof, or a spherical mirror;
    said convex mirror is located above said dioptric system and in front of and obliquely upward on said predetermined position for the observing pupil, or a half mirror located at the front of the predetermined position for the observing pupil;
    if the concave mirror is an ellipsoid mirror and the convex mirror is the hyperboloid mirror, one of focus points of said ellipsoidal mirror coincides with one of focus points of said convex mirror, and an other one of focus points of said ellipsoidal mirror is located at said predetermined position for the observing pupil, and an other one of focus points of said convex mirror is located at a lenticular principal point of said dioptric system;
    if the convex mirror is a parabolic mirror, said dioptric system projects parallel rays of light to said parabolic mirror; and
    a light of the displayed image on said display element is projected to said convex mirror through said dioptric system and the reflected light of the projected light on said convex mirror arrives as an incident light at said concave mirror, and a virtual image of a beam of reflected light of the incident light on said concave mirror is observed at said predetermined position for the observing pupil.

2. The wide field of view head mounted display device according to claim 1, wherein said head mounted display device comprises a physical relationship changing means to change at least two optical relative positions of said display element, said dioptric system and said catoptric system.

3. The wide field of view head mounted display device according to claim 2, wherein a half mirror is disposed between said display element and said dioptric system, and an imaging element for picking-up an image of said observing pupil is disposed to receive said image of said observing pupil from the half mirror.

4. The wide field of view head mounted display device according to claim 1, wherein said concave mirror is a spherical mirror,
    if the convex mirror is a parabolic mirror, a center of curvature of said spherical mirror as said concave mirror coincides with a focus point of said parabolic mirror as said convex mirror, and if the convex mirror is a spherical mirror, a center of curvature of said spherical mirror as said convex mirror and said center of curvature of said spherical mirror as said concave mirror is located at said predetermined position for the observing pupil, and
    said convex mirror is a half mirror placed at the front of said predetermined position for the observing pupil.

5. The wide field of view head mounted display device according to claim 4, wherein said head mounted display device comprises a physical relationship changing means to change at least two optical relative positions of said display element, said dioptric system and said catoptric system.

6. The wide field of view head mounted display device according to claim 5, wherein a half mirror is disposed between said display element and said dioptric system, and an imaging element for picking-up an image of said observing pupil is disposed to receive said image of said observing pupil from the half mirror.

7. A wide field of view head mounted display device comprising:
    a display element for displaying an image;
    a dioptric system for projecting a displayed image on the display element; and
    a catoptric system with a concave mirror and a convex mirror, the convex being a hyperboloid mirror comprising two sheets or a spherical mirror, if the convex mirror is a hyperboloid mirror, either focus point of the hyperboloid mirror is located in a lenticular principal point of the dioptric system, wherein
    the display element, the dioptric system and the catoptric system are arranged in a relative relationship in such a manner that a light of the displayed image on the display element is projected to the convex mirror through the dioptric system and a reflected light of the projected light on the convex mirror arrives as an incident light at the concave mirror, and a virtual image of a beam of reflected light of the incident light on the concave mirror is observed at a predetermined position for an observing pupil.

8. The wide field of view head mount display device according to claim 7, wherein the concave mirror is an ellipsoide mirror defining a part of an elliptical shape when viewing from a side position thereof, one of the focus points of the ellipsoide mirror coincides with one of focus points of the convex mirror, an other one of the focus points of the ellipsoide mirror is located at the predetermined position of the observing pupil.

9. The wide field of view head mount display device according to claim 7, wherein:
the concave mirror is a spherical mirror, a center of curvature of the spherical mirror coinciding with a center of curvature of the convex mirror when the convex mirror is a spherical mirror; and
the convex mirror is a half mirror placed in front of the predetermined position of the observing pupil.

10. The wide field of view head mounted display device according to claim 7, wherein the head mounted display device comprises a physical relationship changing means to change at least two optical relative positions of the display element, the dioptric system and the catoptric system.

11. A wide field of view head mounted display device according to claim 10, wherein a half mirror is disposed between the display element and the dioptric system, and an imaging element for picking-up an image of the observing pupil is disposed to receive the image of the observing pupil from the half mirror.

12. A wide field of view head mounted display device comprising:
a display element for displaying an image;
a dioptric system for projecting a displayed image on the display element; and
a catoptric system with a concave mirror and a convex mirror, the convex being a parabolic mirror defining a part of a parabolic line when viewing from a side position thereof, the convex mirror being located above the dioptric system and in front of and obliquely upward of a predetermined position of an observing pupil, the dioptric system projecting parallel rays to the parabolic mirror,
the display element, the dioptric system and the catoptric system are arranged in a relative relationship in such a manner that a light of the displayed image on the display element is projected to the convex mirror through the dioptric system and a reflected light of the projected light on the convex mirror arrives as an incident light at the concave mirror, and a virtual image of a beam of reflected light of the incident light on the concave mirror is observed at the predetermined position for the observing pupil.

13. The wide field of view head mounted display device according to claim 12, wherein the head mounted display device comprises a physical relationship changing means to change at least two optical relative positions of the display element, the dioptric system and the catoptric system.

14. The wide field of view head mounted display device according to claim 13, wherein a half mirror is disposed between the display element and said dioptric system, and an imaging element for picking-up an image of the observing pupil is disposed to receive the image of the observing pupil from the half mirror.

15. The wide field of view head mounted display device according to claim 12, wherein:
the concave mirror is an ellipsoide mirror defining a part of an elliptical shape when viewing from a side position thereof, one of focus points of the ellipsoide mirror coinciding with a focus point of the convex mirror; and
an other one of the focus point of the convex mirror being located at the predetermined position of the observing pupil.

16. The wide field of view head mounted display device according to claim 15, wherein the head mounted display device comprises a physical relationship changing means to change at least two optical relative positions of the display element, the dioptric system and the catoptric system.

17. The wide field of view head mounted display device according to claim 16, wherein a half mirror is disposed between the display element and the dioptric system, and an imaging element for picking-up an image of the observing pupil is disposed to receive the image of the observing pupil from the half mirror.

18. The wide field of view head mounted display device according to claim 12, wherein the concave mirror is a spherical mirror, the center of curvature of the concave mirror coinciding with a focus point of the convex mirror, the center of curvature of the concave mirror being located at the predetermined position of the observing pupil, and the convex mirror is a half mirror placed at a front of the predetermined position of the observing pupil.

19. The wide field of view head mounted display device according to claim 18, wherein the head mounted display device comprises a physical relationship changing means to change at least two optical relative positions of the display element, the dioptric system and the catoptric system.

20. The wide field of view head mounted display device according to claim 19, wherein a half mirror is disposed between the display element and the dioptric system, and an imaging element for picking-up an image of the observing pupil is disposed to receive the image of the observing pupil from the half mirror.

* * * * *